United States Patent [19]

Ikehara

[11] Patent Number: 5,051,606
[45] Date of Patent: Sep. 24, 1991

[54] METHOD OF CONNECTING AND DISCONNECTING A BOARD IN A HOT STATE

[75] Inventor: Shohei Ikehara, Yokohama, Japan

[73] Assignee: Fujitsu Limited, Kawasaki, Japan

[21] Appl. No.: 434,754

[22] Filed: Nov. 13, 1989

[30] Foreign Application Priority Data

Nov. 19, 1988 [JP] Japan .................. 63-293191

[51] Int. Cl.⁵ .............................. G06F 13/40
[52] U.S. Cl. ...................... 307/134; 307/31; 307/38; 371/8.1
[58] Field of Search .............. 307/11, 12, 38-40, 307/96, 97, 112, 116, 134, 139, 140, 480, 29, 31, 41, 42, 149; 364/184; 371/8.1, 9.1, 10.1

[56] References Cited

U.S. PATENT DOCUMENTS 4,200,865  4/1980  Morioka et al. .................. 340/536
4,510,553  4/1985  Faultersack .................. 361/413

FOREIGN PATENT DOCUMENTS 0241905 10/1987 European Pat. Off. .
0254456  1/1988 European Pat. Off. .

*Primary Examiner*—A. D. Pellinen
*Assistant Examiner*—David Osborn
*Attorney, Agent, or Firm*—Armstrong, Nikaido, Marmelstein, Kubovcik, & Murray

[57] ABSTRACT

A device for connecting and disconnecting a board in a hot state includes a board and a mother-board. The board has mounted thereon dynamic elements through which a low electric current flows during a clock signal disabled state, and a clock signal enable or disable circuit. When a board must be connected or disconnected in the hot state due to a fault therein, the clock circuit in the board is set to the disabled state. The board is connected or disconnected while a low current flows therethrough, after a new board is connected, the clock signal disabled state is released. Thus a connector connecting the board with the mother-board cannot be damaged by a flow of a large electric current during a connection or disconnection of the boards.

8 Claims, 4 Drawing Sheets

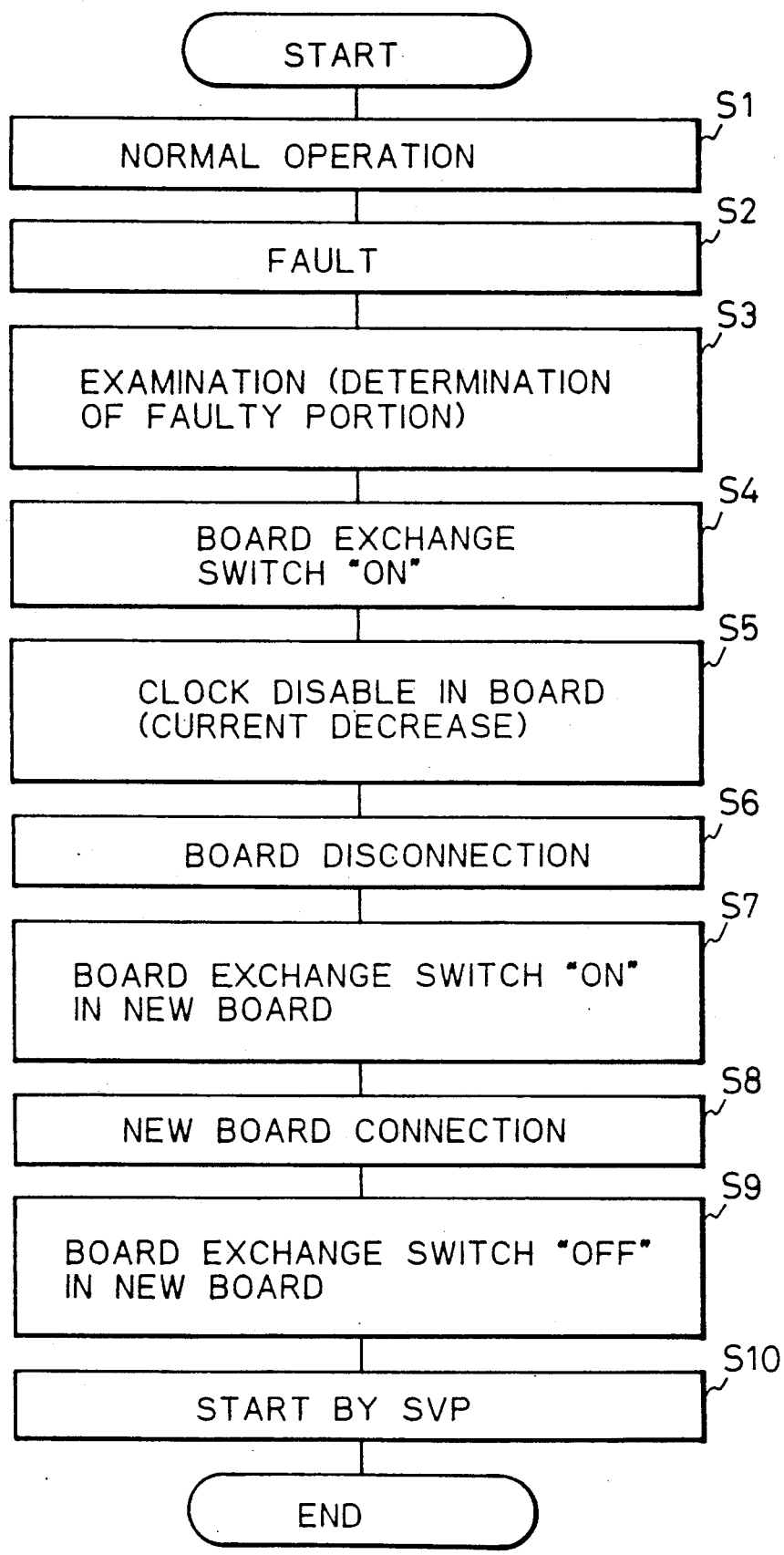

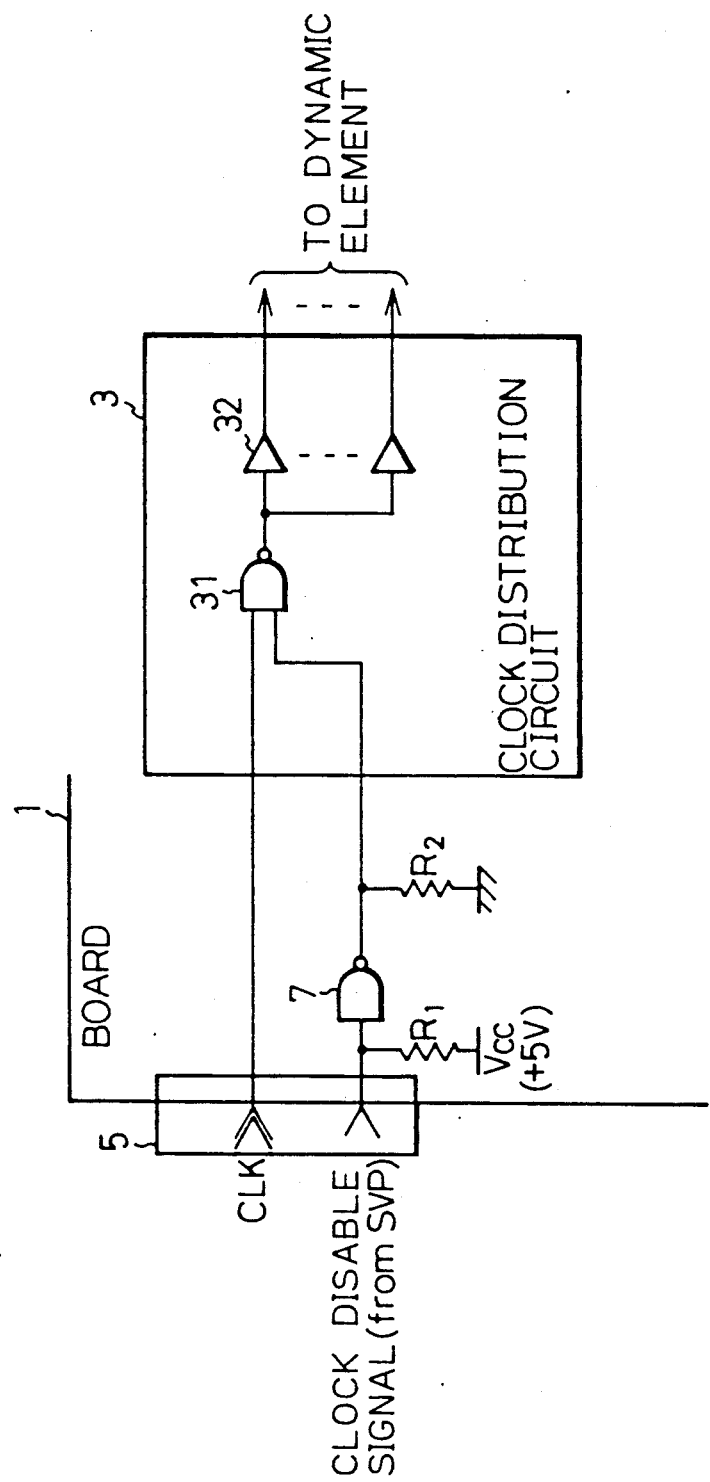

METHOD OF CONNECTING AND DISCONNECTING A BOARD IN A HOT STATE

BACKGROUND OF THE INVENTION

1. Field of the Invention

The present invention relates to a method of connecting and disconnecting a board in a hot state, i.e., while power is supplied thereto, and a device for executing the method.

Recent increases in the use of online computer systems have incurred a need to ensure the reliability of these systems, to enable a non-stop operation thereof. During such a non-stop operation, however, if a fault occurs in the system the faulty portion must be replaced by a standby device; that is, the faulty device is replaced by an operative device without switching the power supply to the system off. The purpose of the present invention is to enable the above procedure to be carried out.

2. Description of the Related Art

In a conventional method, a board (printed circuit board assembly) is connected and disconnected in a hot state as follows. Namely, when the board is connected to the system, the ground pins are first connected to the board and then the power source supply pins are connected, and accordingly, damage to and failure of elements (e.g., memory elements, etc.) mounted on the board are prevented. If a small current is flowing through the board and the pin current capacity is sufficient, the board continues to operate as usual when this method is applied.

Nevertheless, if the current capacity of one pin is not sufficient, and a plurality of power source pins must be used, when the board is connected to or disconnected from a mother-board through a connector(s), a simultaneous connection or disconnection of the plurality of pins cannot be carried out, and thus sometimes a large current flows through only one pin, whereby that pin is destroyed. Accordingly, conventionally, it is not possible to connect and disconnect a board through which a large current flows while the board is in the hot state.

SUMMARY OF THE INVENTION

An object of the present invention is to enable, when necessary, the connection and disconnection of a board through which a large current flows, without the need to switch off the power supplied to the board, while preventing damage to the connection terminal thereof. This object can be attained by providing a clock enable or disable means which supplies a clock to dynamic elements mounted on the board and by connecting and disconnecting the board in the hot state while a low current flows therethrough.

Accordingly, in one aspect of the present invention, there is provided a method of connecting and disconnecting a board in a hot state, using a device comprising a board, a mother-board to ,which the board is connected, and a connector devices for connecting the board to the mother-board, the board including dynamic elements through which an electric current flows upon a reception thereby of a clock signal, and a clock enable or disable device by which the clock signal is supplied to the dynamic elements; the method comprising the steps of: placing the clock enable or disable device in a disabled state; disconnecting the board from the mother-board; connecting an operative board, in which the clock enable or disable device is in the disabled state, to the mother-board through the connector device; and changing the clock enable or disable device from a disabled state to an enable state.

In another aspect of the present invention there is provided a device for connecting and disconnecting a board in a hot state, comprising a board including dynamic elements through which an electric current flows upon a reception thereby of a clock signal, and a clock enable or disable device which supplies or does not supply a clock signal to the dynamic elements; a mother-board for supplying an electric current to the board and for receiving and supplying electric signals to the board; and connector device for connecting the board to the mother-board; wherein the board is disconnected from the mother-board after the clock enable or disable device is set to the disabled state; and another board is connected to the mother-board after the clock enable or disable device is set to the disabled state in the another board, and the clock enable or disable device in the another board is then set to the enable state.

Other features and advantages of the invention will be apparent from the following description given with reference to the accompanying drawings.

BRIEF DESCRIPTION OF THE DRAWINGS

FIG. 3 is a diagram for explaining the operation of the device of FIG. 2; and

FIG. 4 is a circuit diagram of a board connection and disconnection device according to another embodiment of the present invention.

DESCRIPTION OF THE PREFERRED EMBODIMENTS

Figure 1:
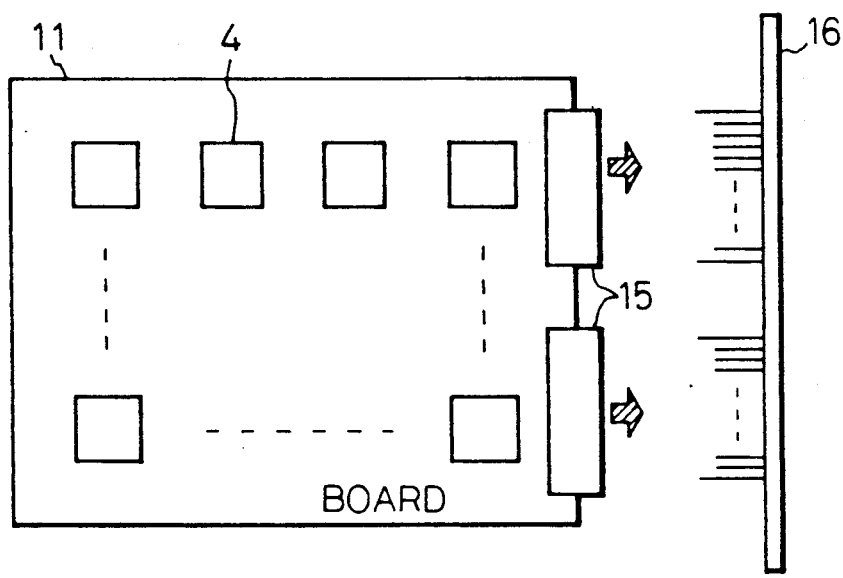
FIG. 1 is a side view of a conventional combination of a board and a mother board.

Prior to the explanation of the embodiments of the present invention, the connection and disconnection of a conventional board in a hot state is explained with reference to FIG. 1. In FIG. 1, a board 11 is connected to a mother-board 16 through a connector 15; the board 11 having dynamic elements 4 mounted thereon. The ground pins of the mother-board 16 are longer than the other pins, some of which supply electric power to the board 11 and some of which connect signal lines between the board 11 and mother-board 16. When the board 11 is connected, first the ground pins are connected to the connectors 15. If a small electric current is flowing therethrough, this method is appropriate, but if the dynamic elements are supplied with electric power (current) by clock signals, a first contacting pin will be destroyed due to the flow therethrough of a large current greater than the capacity of the pin. This is a disadvantage of the above conventional connection and disconnection method.

Embodiments of the present invention are now explained with reference to FIGS. 2 to 4.

Figure 2:
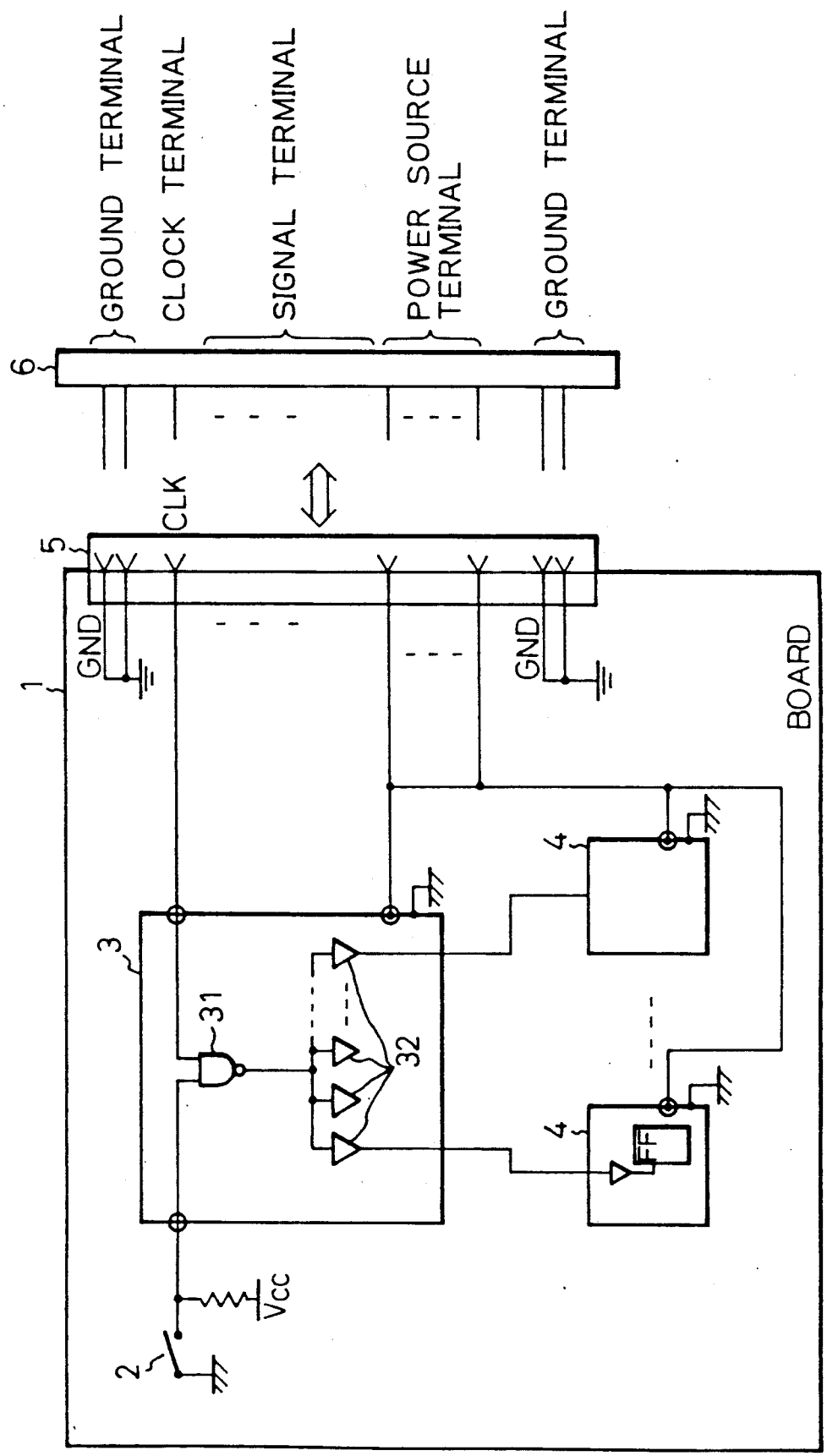
FIG. 2 is a circuit diagram of a board connection and disconnection device according to an embodiment of the present invention.

A circuit diagram of an embodiment of a device according to the present invention is shown in FIG. 2. This device comprises a board 1 and a mother-board 6. As shown in FIG. 2, on the board 1 are mounted a plurality of dynamic elements, a board exchange switch 2 for setting a clock enable or disable state to the dynamic elements 4, a clock distribution circuit 3 for supplying or not supplying the clock signal (CLK) to the dynamic elements 4 in response to "OFF" and "ON" operations of the switch 2, and a connector 5 connecting the board 1 with the mother-board 6. The dynamic elements 4 are a CMOS circuit or Bi-CMOS circuit, which require only a very small electric current when in a non-operative state, i.e., when the clock signal is not supplied. The Bi-CMOS circuit comprises a CMOS circuit and a bipolar circuit.

The clock distribution circuit 3 comprises a NAND gate 31 and buffer gates 32, receives clock signals from the connector 5, and distributes the clock signals to the plurality of dynamic elements 4 or stops the supply of the clock signals in accordance with whether the board exchange switch 2 is set to the enable or disable state. The dynamic elements 4 supplied with the clock signals operate in synchronization with the clock. During operation, the electric current is larger than a current capacity of one pin of the connector 5 in the board 1, and therefore, the electric current is supplied through a plurality of power source terminals and a plurality of ground terminals. In addition, when the board exchange switch 2 is "ON", the clock distribution circuit is in the disabled state, and when the switch 2 is "OFF", the clock distribution circuit is in the enable state.

The connector 5 receives the large current flowing from the mother-board 6 to the board 1 through the power source supply terminals and the ground terminals and receives or supplies various signals from or to the mother-board 6.

When the mother-board 6 is in the hot state, i.e., in the state in which power is supplied thereto, the connector 5 can be connected or disconnected from the board 1. The ground pin of the mother-board 6 is long and the power supply pins and the pins for the various signals are short. Accordingly, upon connection, first the ground pins are connected to the terminals of the connector 5 of the board 1, and then the power supply pins are connected to the terminals of the connector 5 of the board 1.

Next, the operation of the above device is explained with reference to FIG. 3.

In FIG. 3, in step S1, the device is operating normally; i.e., the board 1 in FIG. 2 is connected to the mother-board 6 and is operating normally.

In step S2, assuming that a fault has occurred in the board 1 shown in FIG. 2 (e.g., parts breakdown, etc.), the board cannot operate normally.

Then, in step S3, an examination is carried out, whereby the SVP (service processor) detects the fault and determines which is the faulty board.

Thereafter, in step S4, the board exchange switch 2 is turned "ON" (clock disable), and in step S5, the clock signals are not supplied to the board 1, and the current flowing therethrough is lowered. Since the board exchange switch 2 was turned "ON" in step 4, the clock distribution circuit 3 stops the supply of clock signals to the dynamic elements 4, and thus the electric current flowing through the power source terminals and the ground terminals of the connector 5 is lower than the current capacity of one terminal (or pin).

Then in step S6, the board 1 is disconnected, and since the current supplied through the connector 5 is lower than the capacity of one terminal of the connector 5, the board 1 can be disconnected from the mother-board 6 without the fear of damage thereto.

Thereafter in step S7, the board exchange switch 2 of a new board is turned "ON", and in step S8, a new board 1 is connected; i.e., the connector 5 of the new board 1 is connected to the mother-board 6, to replace the old faulty board 1.

Then, in step S9, the board exchange switch 2 of the new board 1 is turned "OFF", and the new clock distribution circuit 3 starts to supply clock signals to the new dynamic elements 4.

Thereafter, in step 10, the new board 1 is operated by the SVP. Namely, the SVP operates the dynamic elements 4 supplied with clock signals after the initializing thereof.

Accordingly, when the board exchange switch 2 is turned "ON", a low current flows through the board, and thus the old board 1 can be disconnected and the new board 1 can be connected, while in the hot state.

Next, an example of the clock enable and disable circuit when operated by remote control is explained with reference to FIG. 4.

In FIG. 4, if an "H level" (high level) clock disable signal is applied to a NAND gate 7 or the "H level" clock signal is applied to the NAND gate 7 by the pull up resistor R due to a disconnection of the connector 5 from the mother-board 6, an "L level" (low level) signal is supplied to a NAND gate 31 which constitutes the clock distribution circuit 3, and the circuit 3 stops the supply of clock signals (CLK) to the dynamic elements 4. Thus since a low current is flowing in the board 1, the connector 5 of the board 1 can be disconnected from the mother-board 6 or the connector 5 of the new board 1 can be connected to the mother-board 6, without danger. Further, the SVP supplies an "L level" signal to the NAND gate 7, an "H level" signal is supplied to the NAND gate 31 in the clock distribution circuit 3, the clock signals are supplied to the dynamic elements 4 and the board 1 operates normally.

As mentioned above, the board 1 can be set to a low current flow state or can be switched to the operating state by remote control from the SVP.

In this invention, as shown in FIG. 2, when the board 1 is disconnected, the board exchange switch is "ON", the clock signal distribution circuit 3 is in the disabled state, and the board 1 is disconnected from the mother-board 6 while a low current flows therethrough. When the board 1 is connected, the new board 1, wherein the board exchange switch is turned "ON", is connected to the mother-board 6, and then the board exchange switch is turned "OFF", the clock signal distribution circuit 3 is in the enable state, and the board operates naturally. Further, as shown in FIG. 4, when the board 1 is disconnected or connected by remote control, the clock signal distribution circuit is set to the disabled state.

Accordingly, in this invention, when the board is connected or disconnected by setting the board exchange switch or by remote control, a low current flow state is set, and accordingly, the connections can be connected or disconnected to or from the mother-board 6. Therefore, since a large current does not flow through the ground terminals or the power source terminals of the connector 5, the board 1 can be connected or disconnected in the hot state, safely and securely.

I claim:

1. A method of connecting and disconnecting a board in a hot state using a device comprising a board, a mother-board to which the board is connected, and connector means for connecting the board to the mother-board, the board including dynamic elements through which an electric current flows upon a reception of clock signals, and the board includes a clock signal enable or disable means by which the clock signals are supplied to the dynamic elements; the method comprising steps of:

setting the clock signal enable or disable means on said board to a disable state while maintaining power thereto;

disconnecting the board from the mother-board;

connecting an operative board, in which the clock enable or disable means is preset to the disable state, to the mother-board through the connector means; and changing the state of the clock signal enable or disable means on said board from a disabled state to an enable state.

2. A method as set forth in claim 1, further comprising the step of executing the change of the state of the clock signal enable or disable means by a board exchange switch means mounted on the board.

3. A method as set forth in claim 1, further comprising the step of executing the change of the state of the clock signal enable or disable means by an external remote control signal.

4. A method as set forth in claim 1 wherein after said clock signal enable or disable means is disabled, clock signals to only said board in said disabled state are stopped.

5. A method as set forth in claim 1 wherein power to said mother-board is maintained in an enable state when said board is in said disable state.

6. A system which permits connecting and disconnecting a board in a hot state, comprising:

a board including dynamic elements through which an electric current flows upon a reception of clock signals and a clock signal enable or disable means which supplies or stops the supply of clock signals to the dynamic elements;

a mother-board for supplying an electric current to the board and for receiving and supplying electric signals to the board; and connector means for connecting the board to the mother-board;

wherein the board is disconnected from the mother-board after the clock signal enable or disable means on said board is set to the disabled state while maintaining power thereto; and another board is connected to the mother-board after the clock signal enable or disable means thereof is set to the disabled state, and then the clock signal enable or disable means in the another board is set to the enable state.

7. A system as set forth in claim 6, wherein the clock signal enable or disable means further comprises a board exchange switch, wherein when the board exchange switch is "ON", the clock signal enable or disable means is set to the disabled state, and when the board exchange switch is "OFF", the clock signal enable or disable means is set to the enable state.

8. A system as set forth in claim 6, wherein the clock signal enable or disable means is controlled by an external remote control signal.

* * * * *